(No Model.)  3 Sheets—Sheet 1.

W. H. COOLEY.
ELECTRIC MOTOR AND MOTOR GENERATOR.

No. 561,867.  Patented June 9, 1896.

Witnesses:
Howard L. Wilson
Harrison L. Wilson

Inventor
Wm. H. Cooley.

(No Model.) 3 Sheets—Sheet 3.

W. H. COOLEY.
ELECTRIC MOTOR AND MOTOR GENERATOR.

No. 561,867. Patented June 9, 1896.

Witnesses:
Howard L. Wilson
Harrison L. Wilson

Inventor:
Wm. H. Cooley

UNITED STATES PATENT OFFICE.

WILLIAM H. COOLEY, OF BROCKPORT, NEW YORK.

ELECTRIC MOTOR AND MOTOR-GENERATOR.

SPECIFICATION forming part of Letters Patent No. 561,867, dated June 9, 1896.

Application filed May 21, 1895. Serial No. 550,038. (No model.)

*To all whom it may concern:*

Be it known that I, WILLIAM H. COOLEY, a citizen of the United States, residing at Brockport, in the county of Monroe and State of New York, have invented certain new and useful Improvements in Electric Motors and Transformers, of which the following is a specification.

The object of my invention is the construction of a motor-transformer in which the motor element shall predominate sufficiently for power purposes and in which the speed of such motor also shall be automatically regulated within the limits of the normal load.
My invention is applicable equally to the transformation and utilization of either alternating or direct currents.

Figure 3:
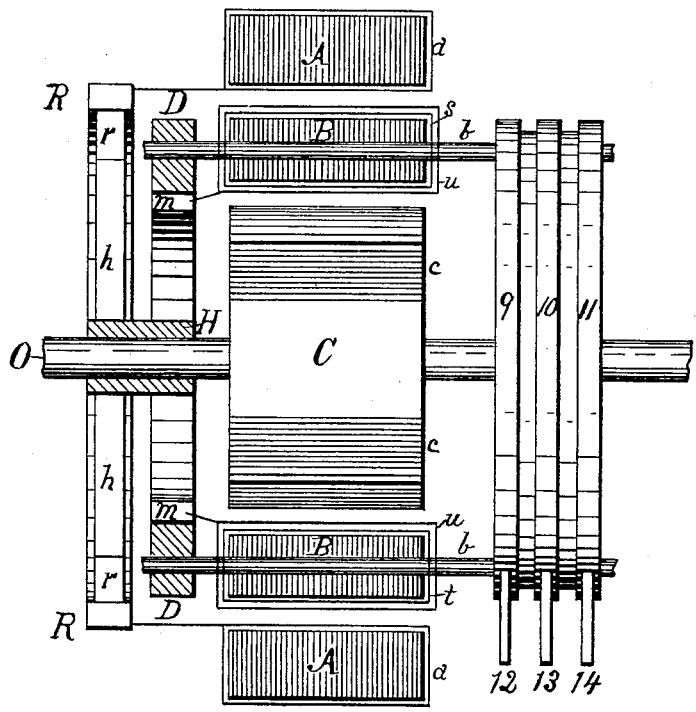
Figure 4:
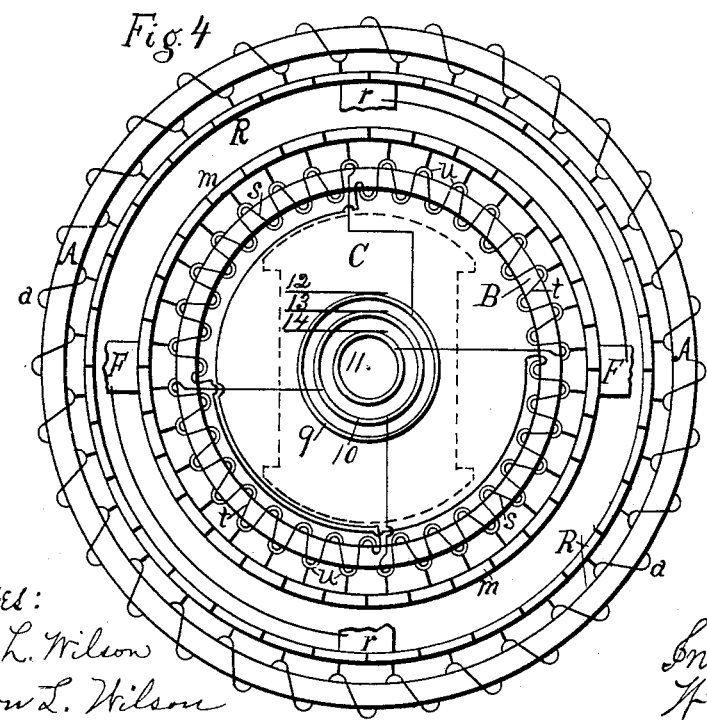

My invention consists in combining with a rotary transformer (preferably exerting a rotary effort only sufficient for the work of transforming) a motor proper with a rotary effort sufficient for performing the work to be done. This combination between the elements of a rotary transformer and the elements of a motor proper I make in such a way that the rotary effort between the motor elements shall produce rotation in such a direction that when connected to one of the rotary tranformer elements it shall constitute a rotation between such transformer elements and in a proper direction. For this purpose it is preferable that both of the transformer elements should be revoluble and that one of them should be mechanically connected with the revoluble motor element, or, indeed, it may constitute one and the same element, and in this case, when used with multiphase alternating currents, a single winding may be carried by such element for producing a torque relation between such element and the other rotary transformer element and also between such element and the other motor element proper. Such common element then may also carry a secondary winding for supplying induced currents therefrom to windings on the other rotary transformer element and also to windings on the other element of such motor proper. Such a construction, just described, is illustrated in Figs. 3 and 4 diagrammatically; but when my machine is to be used with single-phase alternating currents then that element which is common to both the transformer and the motor proper may carry upon one of its surfaces a winding which shall constitute the winding for the motor proper and be located in operative relation to the other element of such motor. Such common element may also carry upon another of its surfaces a winding located in operative relation to the other element of such rotary transformer. This last - mentioned surface of such common element may also carry a second winding, which may be termed the "generative" winding, or the winding in which the currents are transformed or induced which are supplied to the first-named winding on such common element and to the winding on the other element of such motor proper and located in operative relation thereto. The alternating currents may be supplied to the other winding carried on the same surface of the common element with the generative winding. These currents, when thus supplied to such winding and to the winding on the other transformer element, either one or both, produce a relative rotation between the transformer elements.

In the case illustrated by the drawings I have shown the common element as bearing the relation of an armature to another element, being the field to such transformer, and also to still another element constituting the field of such motor proper, and hence, as in the case illustrated by the drawings, this armature, being the load-carrying element of the motor proper, will be prevented at first from revolving by means of a load thereon; but the other transformer element, which is free to revolve, will commence revolving and almost instantly reach a synchronous rotation relative to such armature element, and at this time the armature element—*i. e.*, the windings thereon, constituting the motor-winding—will then be supplied with direct currents. At the same time also the field of such motor proper may be supplied with direct currents. Such armature - winding of the motor proper and also the field-winding, when so supplied, produce the rotation of such armature relative to such field in such a direction as to compensate for or tend to reduce to zero the rotation of the other element of the transformer, which will, however, at the same time maintain a synchronous rotation relative to the first element of such transformer.

Very many obvious modifications might be made in my invention embodying the essential features thereof, one of such main essential features being a construction which shall involve in operation a rotation between the two motor elements in such a direction as to constitute rotation in the desired direction between one of such elements constituting mechanically at least, if not also magnetically and electrically, a common motor and transformer element and the other transformer element coöperating therewith.

My invention further consists in the combination, with the elements of a rotary transformer, of means for producing in one of such elements a rotatively-progressing field or series of fields opposed to a third element to which it bears the relation of armature or field.

The accompanying drawings represent such modifications of my invention as are best calculated to illustrate the same in the most concise form.

In the case illustrated by the drawings apparatus is shown in diagram with a system of connections especially adapted to use with alternating currents; but a slight modification of the internal connections, as will be obvious, adapts the machine to direct-current transformation and utilization.

In the specification and claims following, to avoid circumlocution, I shall make use of the term "elements," meaning by the term, when used in such connection, an armature or a field; but obviously such element may be located in operative relation on two or more sides to other different elements in such a way as to bear the relation of armature to one and field to another. Such a use of the term having become quite common to the art, no further explanation thereof is deemed necessary herein.

In carrying out my invention I make use of three elements. Between one of such elements and either of the others there exists the relation of armature and field. Such middle element, or, rather, the one located in operative relation to the other two, may be mechanically one element. It may even be one element magnetically; but in this case its magnetic mass should be of such an extent as to be capable of carrying without confusion between them the lines of force for two separate and distinct systems of windings—that is, when, as shown in Figures 1 and 2 of the drawings, each side of the middle element, located in operative relation to a different element, has a separate winding thereon.

Figure 1:
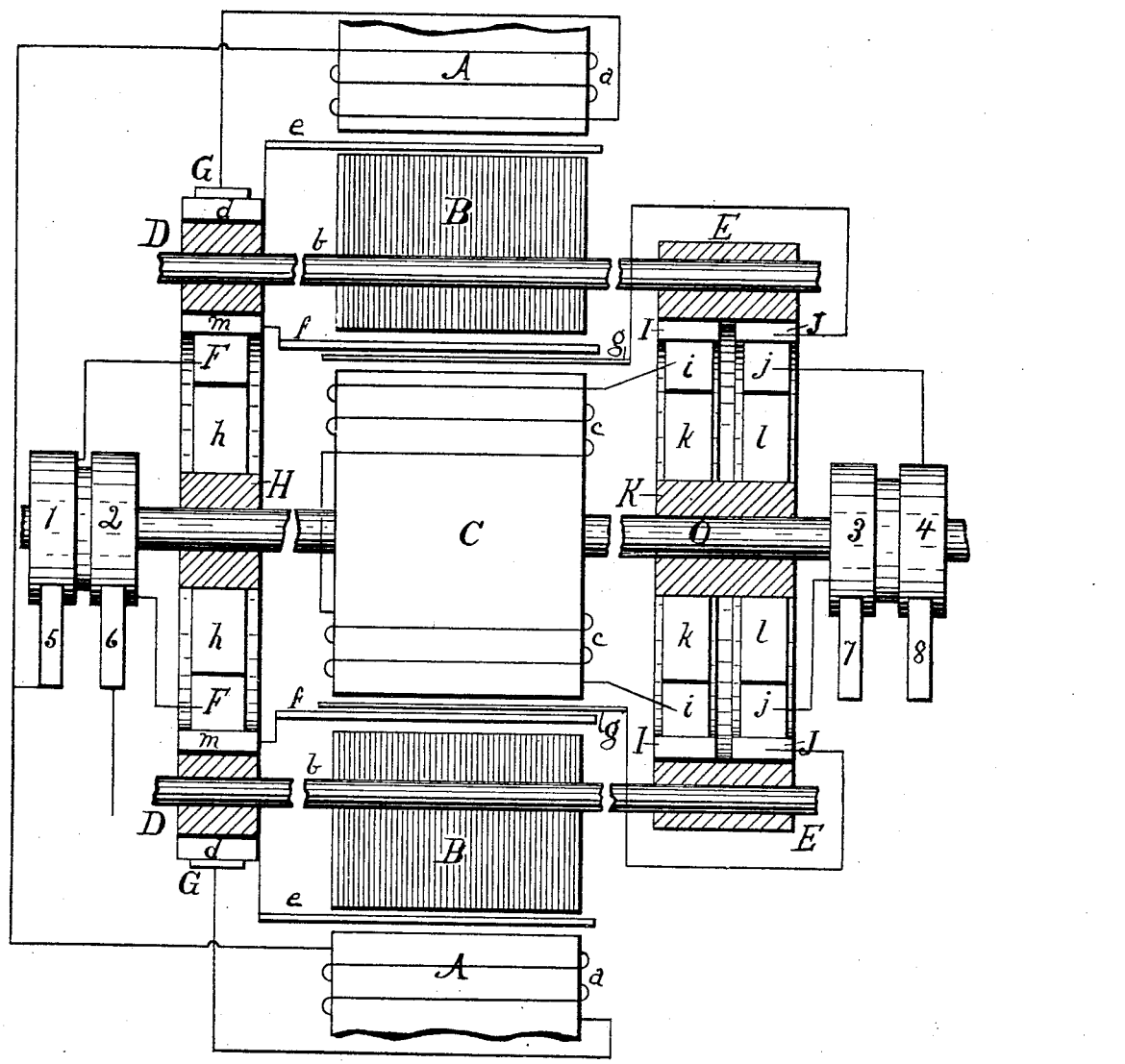
Figure 2:
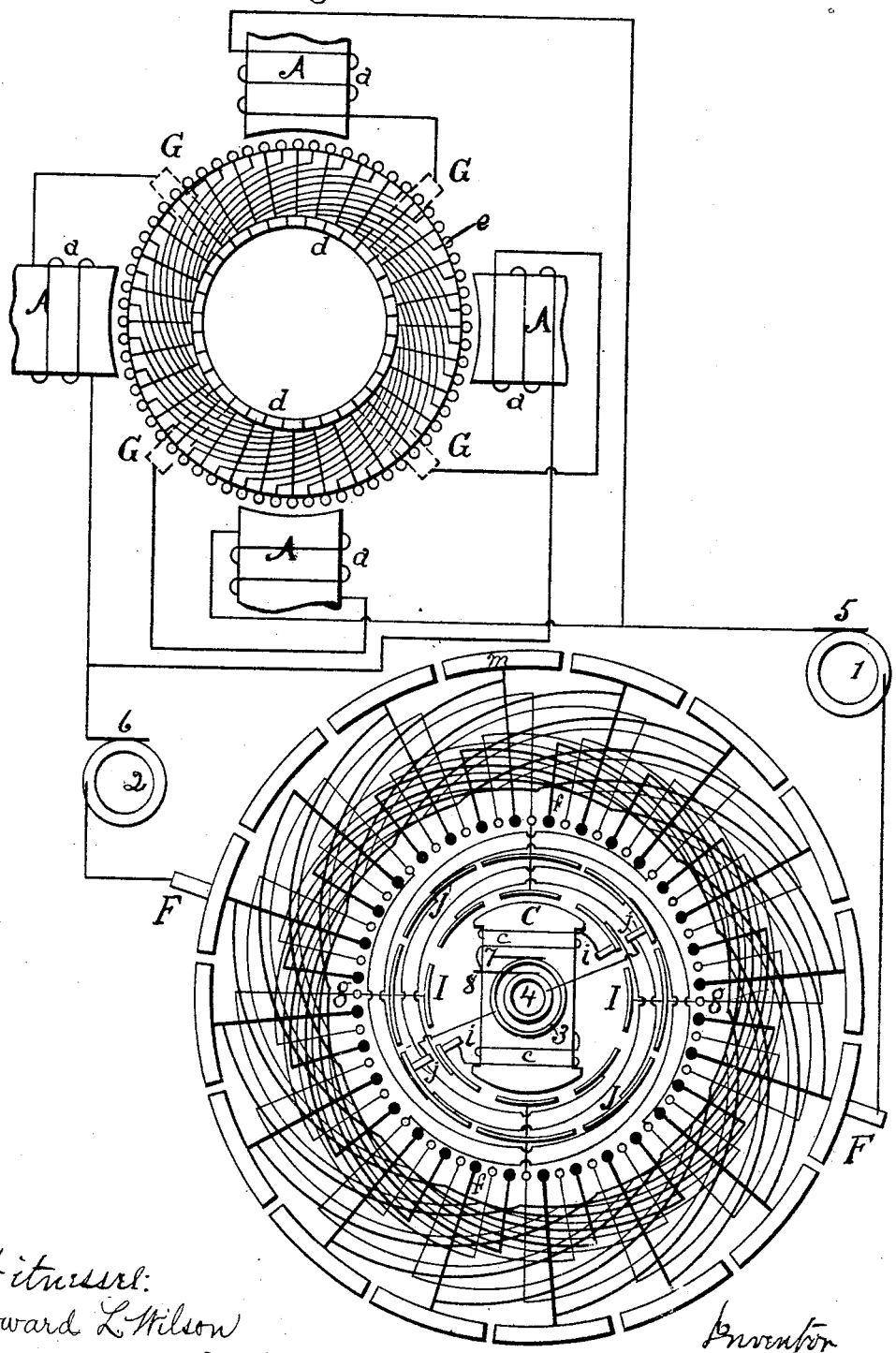

I have made use of drum-windings in the case shown in Figs. 1 and 2 of the drawings to avoid confusion in the connections which would follow in illustrating the case with ring-windings—that is, in those figures of the drawings illustrating the application of my invention to single-phase alternating currents—although, however, obviously, without departing from the spirit of my invention, as will be understood, ring-windings may be used. Such ring-windings I have shown in Figs. 3 and 4, illustrating that modification of my invention especially adapted to double-phase alternating currents. Between two of these elements bearing to each other the relation of armature and field, by means of electric currents, either alternating or direct, supplied to the windings on one or both of them, there is established and maintained a relative rotation. By means of this relative rotation there are induced or generated in a separate and distinct winding on one of such elements electric currents. Such currents may be commutated in and by the well-known manner and means common to direct-current generation. Such direct currents may then be supplied to the windings on a third element or to a separate winding on one of such first-named elements, either one singly or to the windings on a third element and also to a separate winding on one of such first-named elements both together, either in parallel or series. Such third element of course, it will be understood, is always located in operative relation to the last-named separate or distinct winding on one of such first-named elements.

In other words, my invention consists in a rotary transformer preferably delivering direct currents, in combination with a third element, between which and one of the elements of such transformer there is set up and maintained a relative rotation. These elements I prefer to combine together in a manner substantially as follows—that is, I prefer to construct the rotary transformer with both elements revoluble, one of such elements constituting, mechanically, or at least mechanically united to, the rotating element of the motor proper. This last-named element is the load-carrying element of the motor proper, or, in common terms, the "armature." This armature in such an arrangement will of course be located in operative relation upon one side to a fixed element, commonly a field, and upon the other side it is located in operative relation to a rotatable element, which may also be considered as a field. It is desirable that the torque effort exerted upon the middle or intermediate element by both the other elements on either side thereof shall be in the same direction. The result of this is that as the middle element carries a load the other rotatable element constituting the rotary transformer at first revolves, and when alternating currents are used it comes to synchronism. At this time the transformer delivers an induced direct current which is supplied to the third element and to the motor-winding on the middle element, causing the same to rotate in a direction opposite to that of the rotation at first set up in the other rotary transformer element located in operative relation thereto; but as this intermediate element gains in speed the other transformer element slackens in speed until it comes to a full stop, when it may be prevented from rotating in the opposite direction or backward by means of any suitable clutch mechanism admitting of free rotation in one direction only. In the drawings I have shown the rotary transformer elements as contained within the motor proper. I do not, however, limit myself to this style of construction or plan of arrangement of the several elements of my machine.

The accompanying drawings, illustrating my invention, are as follows:

Fig. 1 is a partial vertical longitudinal section of my machine, taken along the central line of the shaft thereof. Fig. 1 also partially shows in diagram the electric connections made in my machine when used with single-phase alternating currents. A full diagram of the connections throughout my machine when used with single-phase alternating currents is shown in Fig. 2. Fig. 3 shows in a view similar to Fig. 1 that modification of my machine adapted to biphase alternating currents, while Fig. 4 shows in diagram the connections made in my machine for such biphase alternating currents.

Referring to Figs. 1 and 2, B is an armature-drum wound internally with insulated conductors $g$ in a symmetrical bipolar winding connected at regular intervals to the sections of a commutator J, having brushes $j$ bearing thereon, such brushes carried by arms $l$ on hub K, secured upon shaft O.

The commutator-sections J are connected to the winding $g$ in the manner following—i. e., every other commutator-section J is connected to a corresponding conductor $g$ and every intermediate commutator-section J to a conductor $g$ located diametrically opposite thereto. The commutator-sections J are connected to the other similar commutator-sections I in the manner following—i. e., every other commutator-section J is connected to a corresponding section I and every intermediate section J to a diametrically opposite section I. The result of these connections just described is (when single-phase alternating currents are supplied to the brushes $j$ through their connections with the contact-rings 3 and 4, as indicated in Fig. 1, having springs 7 and 8, respectively, bearing thereon, for supplying such alternating currents to the machine, and when relative synchronous rotation is reached and maintained between the brushes $i$ and $j$ and the commutators I and J on which they bear) the same as though direct currents were supplied through the brushes $j$ and each commutator-section J was connected to a corresponding conductor $g$. The result of the system of connections shown and described between the commutator-sections I and J is such, as will at once be seen, that the brushes $i$ always take off rectified currents. Such brushes $i$, being connected to the windings $c$ on the field C, supply to such field rectified currents.

The element B being an armature proper to the motor part of my machine, it is held by the load on the machine and prevented thereby from rotating; but in the manner already well known in alternating-current machinery the alternating currents supplied through the brushes 7 and 8 cause the internal field C to rotate and increase in speed until it reaches synchronism, when it is rigidly maintained at a rate of rotation relative to armature B that shall constitute synchronism; but this armature B also carries another symmetrical bipolar drum-winding of the conductors $f$, connected at regular intervals to the commutator-sections $m$, upon which bear the brushes F, carried by arms $h$, projecting from hub H, secured on the shaft O.

The synchronous rotation above described of the element C causes the conductors $f$ to cut lines of force in exactly the same manner as in direct-current machinery, the elements B and C constituting at that time and during such synchronous rotation, so far as the windings $f$ and $c$ are concerned, a direct-current dynamo from which the brushes F take off a direct current. These brushes F are connected, one of them to a collector-ring 1 and the other to a collector-ring 2, having springs 5 and 6, respectively, bearing thereon, taking off such direct current, supplying the same to the windings $a$ on the fields A and to the windings $e$, also located on the armature B, through the brushes G and the commutator-sections $d$, connected with such windings $e$, as indicated in the drawings.

The connections just described are such, as shown and indicated, as to constitute the windings for a series motor having four parallel circuits through the field and armature in series. These connections are so made as to produce a rotation of the armature B in a direction opposite to that of the rotation of the field C; but it has already been explained how a relative rotation between armature B and field C is maintained at the point of synchronism. Hence when this armature B is caused, under the influence of the fields A, to rotate at such synchronous speed the field C comes to a full stop.

In Fig. 2 the winding $f$ is shown in the heavy lines, the conductors $f$ being shaded black, while the winding $g$ is shown in light lines, and the brushes G are indicated in dotted lines.

I will now describe that modification of my invention especially adapted to use with biphase alternating currents. It should be borne in mind, however, that a similar modification may be made therein adapting it to other multiphase alternating currents.

Referring now to Figs. 3 and 4, biphase alternating currents are supplied through springs 12, 13, and 14 and contact-rings 9, 10, and 11 to the biphase ring-windings $s$ and $t$ on the element B in the well-known manner. This element B is also ring-wound with a closed coil of insulated wire $u$, connected at regular intervals to the sections of a commutator $m$, having brushes F (not seen in Fig. 3) bearing thereon and carried by arms $h$ on the hub H, secured on the shaft O.

The internal element C is wound with insulated wire $c$ in a closed coil. The biphase currents supplied to the windings $s$ and $t$ on the element B produce in such element a rotating field or fields, thereby causing the internal element C to revolve and gain in speed until it reaches synchronism. In this way element C is caused to revolve and maintain a synchronous speed, carrying with it the brushes F. These brushes F are not seen in Fig. 3, being located at right angles with the brushes $r$. Hence they cannot be seen, because one of them has been removed by the plane of the section and the other is concealed behind the hub H. They are set at such an angle that they take off direct currents induced in the winding $u$ by the rotatively-progressing poles caused by the biphase currents traversing the windings $s$ and $t$. Supported from other arms $h$ are seen also the brushes $r$, bearing upon the sections of a stationary commutator R, connected to the windings $a$ on the external element A. Each brush $r$ is connected with a corresponding brush F. Hence to the winding $a$ there is supplied a direct current, thus producing in the element A magnetic poles. The brushes $r$ are set at a certain fixed angle at the rear of the brushes F, thus producing an angular displacement between the poles produced in the external element A, in the manner already described, and those set up in the element B by the biphase alternating currents traversing the windings $s$ and $t$ thereon. The result of this angular displacement between the poles in the elements A and B is to produce a rotation of the element B in a direction opposite to that of the interior element C. As the element B increases in speed, owing to the synchronous relation between elements B and C, this interior element C slackens in speed until it comes to a full stop, when the element B has reached synchronous rotation. Thus it will be seen that the external element A, for all speeds of the element B, is energized by direct currents supplied from the winding $u$ in the manner already described—that is, when the machine is used with biphase alternating currents.

Referring now again to Figs. 1 and 2, showing that modification of my machine adapted to single-phase alternating currents, the elements A and B, at least that portion thereof located in operative relation to each other, are energized by direct currents traversing the windings $a$ and $e$, respectively, thereon and supplied from a current-generating winding $f$, located on the inner periphery of the element B. Thus it will be seen that my motor when used with single-phase alternating currents has direct currents supplied to the windings on the load-carrying elements, although when used with biphase alternating currents one of such load-carrying elements is supplied with direct currents and the other with biphase alternating currents, producing poles therein, and that in either case, no matter what the speed of the motor element may be, direct currents wherever utilized are generated in a special winding in the machine itself.

I will mention that under the influence of the torque effort exerted between the elements A and B, when the motor is running with a very light load or no load, the element C has a tendency to revolve backward, as it will be readily understood that the element C may be carried backward at a slower rate of rotation than that of the element B and still this relative synchronous rotation between the elements C and B may be maintained. This tendency of the motor proper to race by revolving the element C backward may be prevented by means of any suitable locking device, of which one form is fully shown and described in my other application for an improvement in electric motors, filed March 12, 1895, and serially numbered 541,419. Hence no further illustration and description thereof is herein contained.

Referring to Fig. 1, it will of course be understood that the commutator-sections $d$ and $m$ revolve with element B, being secured upon a carrying-ring D in any manner so as to be insulated therefrom, as indicated, while the commutators I and J are similarly supported upon a carrying-ring E and suitably insulated therefrom, as indicated. These carrying-rings D and E may be secured upon the bolts $b$, passing through the element B, and by means of which such armature is supported and revolved.

Referring now to Fig. 3, in a similar manner to that already described in Fig. 1 the commutator-sections $d$ therein shown are supported and revolved. The collector-rings 9, 10, and 11 are also similarly supported from and revolved with the element B.

I would have it understood that the accompanying drawings are intended to illustrate the invention only diagrammatically. Hence they are stripped as far as possible of all mechanical details. The mechanical details, construction, and arrangement forming no part of my present invention, being well known in the art, and being already fully shown and described in my other pending applications, they are omitted herefrom in order that the electrical features and the connections which constitute the essential points of my present invention may be more clearly understood.

It will be readily seen that by varying the sectional area and the number of convolutions of the winding $f$ relative to the sectional area and number of the convolutions of the winding $g$ the currents and the potential thereof supplied to the motor elements of my machine, more particulary to the motor-windings, may be caused to bear any desired relation to the current and the potential thereof supplied to the machine, whether used with direct or alternating currents.

Referring to Figs. 1 and 2, attention is called to the fact that the element B may be said in reality to constitute two elements because of the radial depth of the magnetic mass of the element B.

It will be readily understood that all that is necessary for carrying out my invention, when used with single-phase alternating currents and with drum-windings, as shown in Figs. 1 and 2, is that there shall be a magnetic mass capable of carrying the lines of force for the internal winding independent of those to be carried for the external winding. It will, however, be understood that the magnetic continuity of the element B between its inner and outer windings is not essential. It is merely necessary that the magnetic mass of the element B located in operative relation to the element C shall be in some way mechanically united to or connected with the magnetic mass of the element B located in operative relation to the element A.

What I claim is—

1. In an electric machine, a compound element, one of the component parts of which is located in operative relation to a second element and constituting therewith the armature and field of a motor proper, the other component part of such compound element located in operative relation to a third element and constituting therewith the armature and field of a motor-generator, electric conductors constituting a winding on one of such motor-generator elements independent of any winding supplied with electric currents for producing magnetic poles in such motor-generator element, means, independent of relative rotation between such motor elements, for maintaining a relative rotation between such motor-generator elements, such generative winding connected in series with the windings on one of such motor elements.

2. In an electric machine, a compound element, one of the component parts of which is located in operative relation to a second element and constituting therewith the armature and field of a motor proper, the other component part of such compound element located in operative relation to a third element and constituting therewith the armature and field of a motor-generator, electric conductors constituting a winding on one of such motor-generator elements independent of any winding supplied with electric currents for producing magnetic poles in such motor-generator element, means, independent of relative rotation between such motor elements, for inducing electric currents in such generative winding, such generative winding connected in series with the windings on one of such motor elements.

3. In an electric machine, a compound element, one of the component parts of which is located in operative relation to a second element and constituting therewith the armature and field of a motor proper, the other component part of such compound element located in operative relation to a third element and constituting therewith the armature and field of a motor-generator, electric conductors constituting a winding on one of such motor-generator elements independent of any winding supplied with electric currents for producing magnetic poles in such motor-generator element, means, independent of relative rotation between such motor elements, for maintaining a relative rotation between such motor-generator elements, and means for supplying the electric currents induced in such generative winding to windings on one of such motor elements and thereby producing therein magnetic poles bearing a constant angular relation to those in the other one of such motor elements.

4. In an electric machine, a compound element, one of the component parts of which is located in operative relation to a second element and constituting therewith the armature and field of a motor proper, the other component part of such compound element located in operative relation to a third element and constituting therewith the armature and field of a motor-generator, electric conductors constituting a winding on one of such motor-generator elements independent of any winding supplied with electric currents for producing magnetic poles in such motor-generator element, means, independent of relative rotation between such motor elements, for maintaining a relative rotation between such motor-generator elements, and means for supplying the electric currents induced in such generative winding to windings on each of such motor elements and thereby producing in each of such motor elements magnetic poles bearing a constant angular relation to those in the other.

5. In an electric machine, a compound element, one of the component parts of which is located in operative relation to a second element and constituting therewith the armature and field of a motor proper, the other component part of such compound element located in operative relation to a third element and constituting therewith the armature and field of a motor-generator, electric conductors constituting a winding on one of such motor-generator elements independent of any winding supplied with electric currents for producing magnetic poles in such motor-generator element, means, independent of relative rotation between such motor elements, for inducing electric currents in such generative winding, and means for supplying the electric currents induced in such generative winding to windings on one of such motor elements and thereby producing therein magnetic poles bearing a constant angular relation to those in the other one of such motor elements.

6. In an electric machine, a compound element, one of the component parts of which is located in operative relation to a second element and constituting therewith the armature and field of a motor proper, the other component part of such compound element located in operative relation to a third element and constituting therewith the armature and field of a motor-generator, electric conductors constituting a winding on one of such motor-generator elements independent of any winding supplied with electric currents for producing magnetic poles in such motor-generator element, means, independent of relative rotation between such motor elements, for inducing electric currents in such generative winding, and means for supplying the electric currents induced in such generative winding to windings on each of such motor elements and thereby producing in each of such motor elements magnetic poles bearing a constant angular relation to those in the other.

WM. H. COOLEY.

Witnesses:
HOWARD L. WILSON,
HARRISON L. WILSON.